United States Patent
Garg et al.

(10) Patent No.: US 10,572,623 B2
(45) Date of Patent: Feb. 25, 2020

(54) BACK-PRESSURE IN VIRTUAL MACHINE INTERFACE

(71) Applicant: Mentor Graphics Corporation, Wilsonville, OR (US)

(72) Inventors: Ankit Garg, Noida (IN); John R. Stickley, Lake Oswego, OR (US); Deepak Kumar Garg, Noida (IN); Georges Antoun Elias Ghattas, Cairo (EG); Hanan Mohamed Sameh Tawfik, Cairo (EG); Abdallah Galal Yahya Khalil, Cairo (EG)

(73) Assignee: Mentor Graphics Corporation, Wilsonville, OR (US)

( * ) Notice: Subject to any disclaimer, the term of this patent is extended or adjusted under 35 U.S.C. 154(b) by 41 days.

(21) Appl. No.: 15/413,023

(22) Filed: Jan. 23, 2017

(65) Prior Publication Data
US 2018/0113732 A1    Apr. 26, 2018

Related U.S. Application Data

(60) Provisional application No. 62/412,803, filed on Oct. 25, 2016.

(51) Int. Cl.
*G06F 9/46* (2006.01)
*G06F 17/50* (2006.01)
(Continued)

(52) U.S. Cl.
CPC ...... *G06F 17/5077* (2013.01); *G06F 11/2221* (2013.01); *G06F 11/2289* (2013.01);
(Continued)

(58) Field of Classification Search
CPC ............. G06F 9/45558; G06F 11/2221; G06F 11/2289; G06F 11/2733; G06F 13/1673;
(Continued)

(56) References Cited

U.S. PATENT DOCUMENTS 7,319,669 B1 * 1/2008 Kunz ...................... H04L 47/36
370/235
9,098,431 B2 * 8/2015 de Goede ............. G06F 13/105
(Continued)

*Primary Examiner* — Camquy Truong
(74) *Attorney, Agent, or Firm* — Mentor Graphics Corporation

(57) ABSTRACT

This application discloses a computing system having a virtual machine and a host program that communicate via a virtual interface. The virtual machine can generate a data packet for transmission to the host program via the virtual interface. The virtual machine can receive a saturation signal generated by a virtual interface driver in the virtual interface. The virtual interface driver can be configured to populate a virtual buffer in the virtual interface with the data packet. The virtual machine can determine an availability of resources in the virtual buffer to store the data packet based, at least in part, on the saturation signal, and selectively stall transmission of the data packet to the host program based, at least in part, on the saturation signal. The host program can bypass a hypervisor in the computing system to directly access the virtual buffer in the virtual interface.

15 Claims, 6 Drawing Sheets

(51) Int. Cl.
    *G06F 13/16*     (2006.01)
    *G06F 11/22*     (2006.01)
    *G06F 11/273*    (2006.01)

(52) U.S. Cl.
    CPC ...... *G06F 11/2733* (2013.01); *G06F 13/1673* (2013.01); *G06F 17/504* (2013.01); *G06F 17/5031* (2013.01); *G06F 17/5054* (2013.01); *G06F 17/5068* (2013.01); *G06F 17/5081* (2013.01)

(58) Field of Classification Search
    CPC ... G06F 2009/4557; G06F 2009/45583; G06F 2009/45595
    See application file for complete search history.

(56) References Cited

U.S. PATENT DOCUMENTS

| | | | |
|---|---|---|---|
| 9,398,121 B1 * | 7/2016 | Brandwine | H04L 67/10 |
| 9,948,579 B1 * | 4/2018 | Sivaramakrishnan | H04L 67/2842 |
| 10,122,645 B2 * | 11/2018 | Acharya | H04L 47/263 |
| 2004/0249956 A1 * | 12/2004 | Tanimoto | G06F 3/1209 709/227 |
| 2009/0213857 A1 * | 8/2009 | Haynie | H04L 45/00 370/394 |
| 2013/0097600 A1 * | 4/2013 | Cardona | G06F 9/45558 718/1 |

* cited by examiner

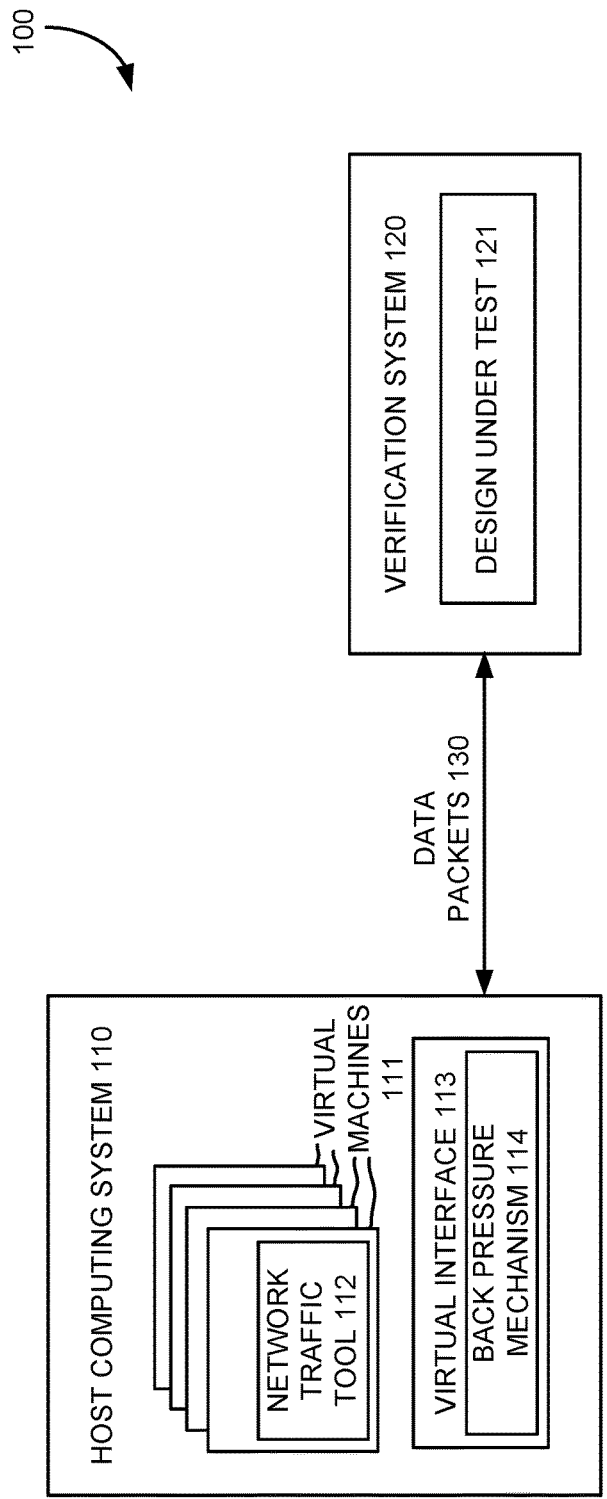
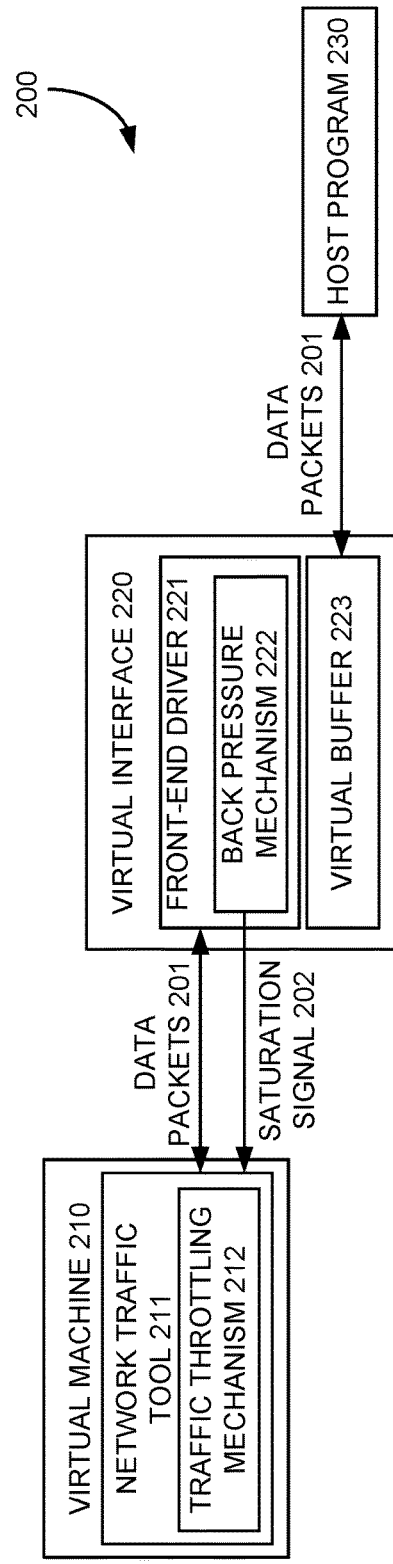

BACK-PRESSURE IN VIRTUAL MACHINE INTERFACE

RELATED APPLICATIONS

This patent application claims priority to U.S. Provisional Patent Application No. 62/412,803, filed Oct. 25, 2016, which is incorporated by reference herein.

TECHNICAL FIELD

This application is generally related to electronic design automation and, more specifically, to back-pressure in virtual machine interface.

BACKGROUND

Many computers can implement virtual machines, each having a virtualization environment to simulate or emulate computer hardware and allow execution of software or an operating system on that simulated or emulated computer hardware. These computers can include hypervisors to create and run the virtualization environments for the virtual machines in the computer. In some instances, the hypervisor can be a Quick Emulator (QEMU) to emulate computer hardware having a different architecture than the underlying computer, which can allow for execution of software applications and guest operating systems.

The computer and associated hypervisors can implement different types of virtualization environments, such as a full virtualization environment or para-virtualization environment. In the full virtualization environment, the computer can run or execute an unmodified version of a guest operating system on the simulated or emulated computer hardware. In the para-virtualization environment, the guest operating system running on the simulated or emulated computer hardware can be modified to allow interaction or communication with the hypervisor through a virtual interface.

The virtual interface can include a para-virtualized or front-end driver to exchange data packets between the virtual machines and at least one virtual buffer. The virtual interface also can include a back-end driver to exchange data packets between the virtual buffer and the hypervisor. For example, when the virtual machine includes a data packet to transmit to the hypervisor, the front-end driver can store the data packet to the virtual buffer in the virtual interface and the back-end driver can consume or load the data packet from the virtual buffer and provide it to the hypervisor.

The hypervisor can exchange the data packets with a host program implemented on the computers. When the virtual machine implements a packet generation application to exchange network traffic with a design under test in a verification system, the host program can exchange the data packets to the verification system.

In some implementations, the back-end driver may consume data packets from the virtual buffer at a slower rate than the front-end driver adds data packets to the virtual buffer. In these implementations, the virtual interface between the virtual machine and the hypervisor may drop one or more of the data packets or the hypervisor may drop one or more of the data packets exchanged between the virtual interface and the host program. For example, when the virtual machine implements a packet generation application to exchange network traffic to the design under test in the verification system, the packet generation application may erroneously consider a drop of one or more data packets by the virtual interface or the hypervisor as a bug in the design under test.

SUMMARY

This application discloses a computing system having a virtual machine and a host program that communicate via a virtual interface. The virtual machine can generate a data packet for transmission to the host program via the virtual interface. The virtual machine can receive a saturation signal generated by a virtual interface driver in the virtual interface. The virtual interface driver can be configured to populate a virtual buffer in the virtual interface with the data packet. The virtual machine can determine an availability of resources in the virtual buffer to store the data packet based, at least in part, on the saturation signal, and selectively stall transmission of the data packet to the host program based, at least in part, on the saturation signal. The host program can bypass a hypervisor in the computing system to directly access the virtual buffer in the virtual interface. Embodiments will be described below in greater detail.

DESCRIPTION OF THE DRAWINGS

FIG. 1 illustrates an example virtual networking system with a network traffic tool communicating with a design under test implemented in a verification system according to various embodiments.

FIG. 2 illustrates an example virtual interface in a host computing system according to various embodiments.

DETAILED DESCRIPTION

Back Pressure in Virtual Machine Interface

Figure 3:
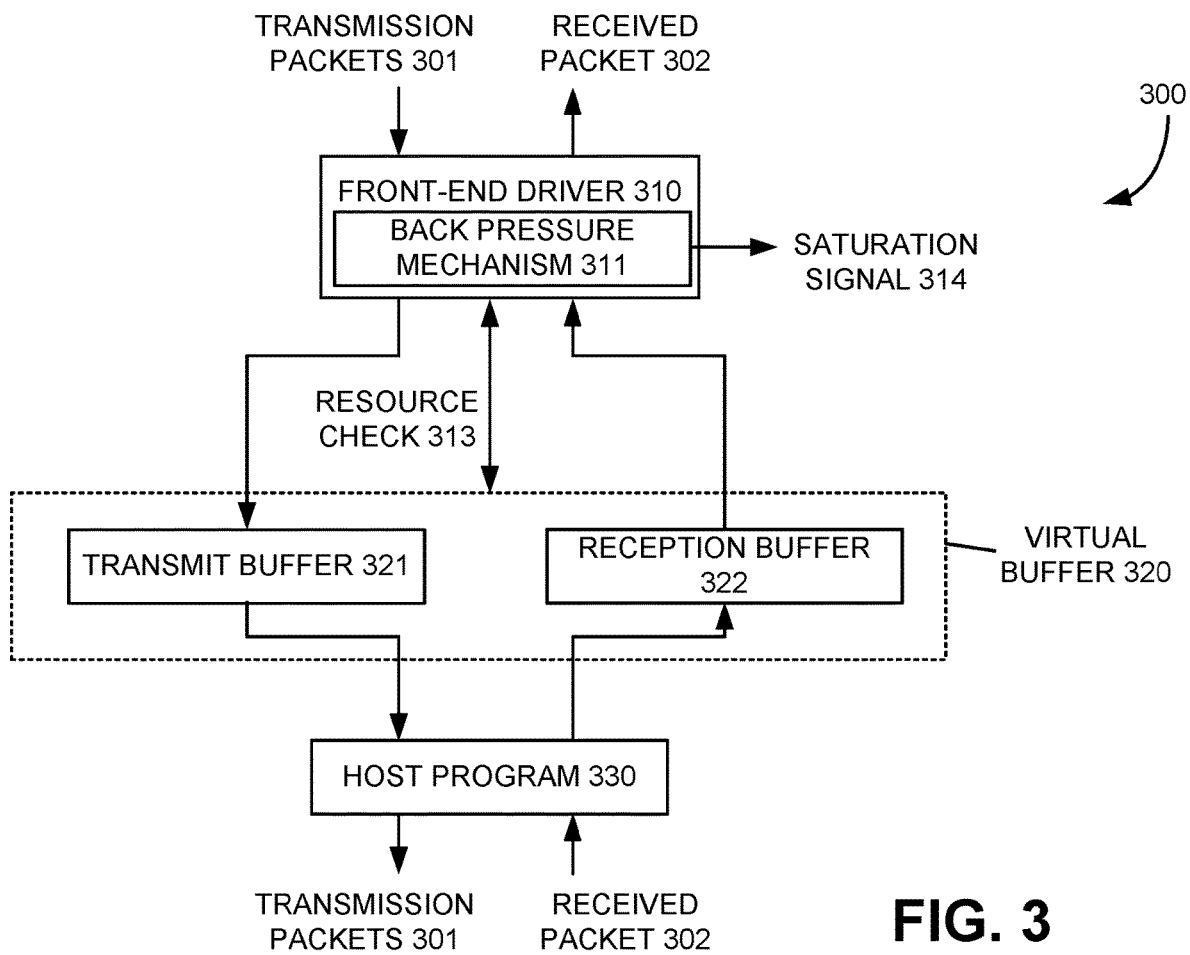
FIG. 3 illustrates an example virtual interface with a back pressure mechanism according to various embodiments.

FIG. 1 illustrates an example virtual networking system 100 with a network traffic tool 112 communicating with a design under test 121 implemented in a verification system 120 according to various embodiments. Referring to FIG. 1, the virtual networking system 100 includes a host computing system 110, such as one or more computers, workstations, or the like. An example implementation of a computer capable of implementing the host computing system 110 is described below with reference to FIGS. 7 and 8.

The virtual networking system 100 can include a verification system 120 to exchange data packets 130 with the host computing system 110. The verification system 120 can be an emulation system, a simulation system, a combination thereof, or the like, which can emulate, simulate, prototype, or the like, a design under test 121. The emulation system can include one or more hardware emulators configured to emulate an electronic system corresponding to the design under test 121. The simulation system can include one or more processing systems configured to simulate an electronic system corresponding to the design under test 121.

The host computing system 110 can execute one or more virtual machines 111, which can create a virtual environment having virtual electronic hardware and run software on the virtual electronic hardware. The host computing system 110 can include a hypervisor to configure and control the virtual machines 111 in the host computing system 110. In some embodiments, the virtual machines 111 can include virtual electronic hardware that mimics the hardware architecture of the host computing system 110, for example, allowing the host computing system 110 to run multiple operating systems. The virtual machines 111 also may virtualize hardware architectures that differ from the architecture of the host computing system 110, such as hardware architecture for different computing system, networking device, or the like.

At least one of the virtual machines 111, in some embodiments, can implement a network traffic tool 112 to generate one or more of the data packets 130 for transmission to the design under test 121 in the verification system 120. The network traffic tool 112 also can receive one or more of the data packets 130 from the design under test 121 in the verification system 120. In some embodiments, the virtual machines 111 implementing the network traffic tool 112 can be implemented in a kernel space or a user space to virtualize hardware architecture of a networking device or the like and run software or other machine-executable instructions to implement the network traffic tool 112. The network traffic tool 112 may generate reports associated with the exchange of the data packets 130 with the design under test 121 in the verification system 120, for example, to indicate how the design under test 121 in the verification system 120 responded to the data packets 130 generated by the network traffic tool 112, abided by one or more communication protocols, or the like. Although FIG. 1 shows a single network traffic tool 112 implemented in one of the virtual machines 111, in some embodiments, multiple instances of the network traffic tool 112 can be implemented in a common virtual machine, in different virtual machines, or the like. In some embodiments, a plurality of the virtual machines 111 may each include multiple instances of the network traffic tool 112.

The virtual machines 111 can exchange the data packets 130 with the verification system 120 through a host program implemented on the host computing system 110. For example, the host program implemented on the host computing system 110 can bypass the hypervisor and directly interact with the virtual interface 113 to exchange the data packets 130 with the virtual machines 111. As will be described below in FIGS. 2 and 3 in greater detail, the virtual interface 113 can be implemented at least partially by the virtual machines 111 and at least partially by the host program implemented in the host computing system 110.

Since the operating speed of the virtual machines 111 in the host computing system 110 can be different than the operating speed of the verification system 120, the virtual interface 113 may lack of storage space in a virtual buffer of the virtual interface 113 to store one or more of the data packets 130. For example, when the virtual machines 111 operate more quickly than the verification system 120, the virtual machines 111 may attempt to add one or more of the data packets 130 to the virtual buffer at a faster rate than the host program implemented in the host computing system 110 can read them from the virtual buffer for transmission towards the verification system 120.

The virtual interface 113 can include a back pressure mechanism 114 to determine an availability of resources in the virtual buffer to store the data packets 130. In some embodiments, the back pressure mechanism 114 can generate a saturation signal based on the availability of the resources in the virtual buffer, which can be provided to the virtual machines 111. The virtual machines 111, based on the saturation signal, can selectively stall transmission of one or more of the data packets 130 towards the verification system 120 via the virtual interface 113. Embodiments of back pressure detection and throttling data packet transmission will be described below in greater detail.

FIG. 2 illustrates an example virtual interface 220 in a host computing system 200 according to various embodiments. Referring to FIG. 2, the host computing system 200 can include a virtual machine 210 having a virtual environment to implement a network traffic tool 211. The network traffic tool 211 can exchange data packets 201 with a design under test in a verification system through a host program 230 via a virtual interface 220. The host program 230 can intercept data packets 201 output from the network traffic tool 211 via the virtual interface 220 and then transmit the intercepted data packets 201 to the verification system. The host program 230 or other transaction application, in some embodiments, can convert the data packets 201 between software structures, such as C++, or the like, utilized in the host computing system 200 and hardware structures, such as System Verilog or other hardware description language (HDL) structure, utilized in the verification system. The host program 230 can be a single-threaded or a multi-threaded program configured to run on the host computing system 200, for example, as a user application from a user space, as a kernel driver from a kernel space, as a virtual device having a driver to access the virtual interface 220, or the like. In some instances, the host program 230 implemented as a statically-linked driver built in kernel file or a dynamically-loadable kernel module, each of which can be configured to extend the functionality of a kernel in the host computing system 200.

The virtual interface 220 can include a front-end driver 221 to exchange one or more of the data packets 201 with the network traffic tool 211. During a data packet transmission towards the verification system, the front-end driver 221 can receive one or more of the data packets 201 from the network traffic tool 211 and store the received data packets 201 to a virtual buffer 223. The virtual buffer 223 can be at least a portion of a shared memory area between the virtual machine 210 and the host program 230. During a data packet reception from the verification system, the front-end driver 221 can read or consume one or more of the data packets 201 from the virtual buffer 223 and provide the read data packets to the network traffic tool 211.

During a data packet transmission towards the verification system, the host program 230 can read or consume one or more of the data packets 201 directly from the virtual buffer 223, for example, bypassing the hypervisor of the host computing system. During a data packet reception from the verification system, the host program 230 can store the data packets 201 directly to the virtual buffer 223, for example, bypassing the hypervisor of the host computing system. In some embodiments, the host program 230 can determine the available space in the virtual buffer 223 to store the data packets 201, and selectively stall the storing of the data packets 201 to the virtual buffer 223 based on the determined available space. By reading and storing the data packets 201 directed with the virtual buffer 223, the host program 230 can eliminate the potential loss or drop of one or more of the data packets 201 that could occur during an exchange through a hypervisor. The virtual interface 220 can be implemented at least partially by the virtual machine 210 and at least partially by the host program 230.

The front-end driver 221 can include a back pressure mechanism 222 to determine an availability of resources in the virtual buffer 223 to store the data packets 201 received from the network traffic tool 211. In some embodiments, the back pressure mechanism 222 can perform one or more checks on the virtual buffer 223, which can ascertain portions of the virtual buffer 223 having data packets 210 already read by the host program 230 and also portions of the virtual buffer 223 having data packets 210 awaiting to be read by the host program 230. The back pressure mechanism 222 can perform these checks in response to receiving at least one of the data packets 201 from the network traffic tool 211 or independently of any data packet reception from the network traffic tool 211.

The back pressure mechanism 222 can generate a saturation signal 202 based on the availability of the resources in the virtual buffer 223. The saturation signal 202 can identify the results of the checks, for example, those portions of the virtual buffer 223 having data packets 210 read by the host program 230, portions of the virtual buffer 223 having data packets 210 awaiting to be read by the host program 230, or both. In some examples, the saturation signal 202 can identify an available storage space within the virtual buffer 223.

The network traffic tool 211 can include a traffic throttling mechanism 212 to receive the saturation signal 202 from the back pressure mechanism 222 in the front-end driver 221. The traffic throttling mechanism 212 can utilize the saturation signal 202 to selectively prompt the network traffic tool 211 to stall transmission of one or more of the data packets 201 towards the verification system. The traffic throttling mechanism 212 can identify the available storage space within the virtual buffer 223 based on the saturation signal 202. When the traffic throttling mechanism 212 determines a size of the next data packet the network traffic tool 211 intends to transmit towards the verification system exceeds the available storage space within the virtual buffer 223, the traffic throttling mechanism 212 can prompt the network traffic tool 211 to stall transmission of the next data packet. In some embodiments, the traffic throttling mechanism 212 can prompt the network traffic tool 211 to stall transmission of the next data packet for a predetermined period of time, to stall transmission by altering a transmission rate of one or more future data packets, to stall transmission until the traffic throttling mechanism 212 provides a prompt for the network traffic tool 211 to transmit the next data packet, or the like.

When the traffic throttling mechanism 212 determines the available storage space within the virtual buffer 223 exceeds a size of the next data packet the network traffic tool 211 intends to transmit towards the verification system, the traffic throttling mechanism 212 can prompt the network traffic tool 211 to transmit the next data packet. In some embodiments, the traffic throttling mechanism 212 also can prompt the network traffic tool 211 to increase a transmission rate of one or more future data packets based on a size of the storage space in the virtual buffer 223.

FIG. 3 illustrates an example virtual interface 300 with a back pressure mechanism 311 according to various embodiments. Referring to FIG. 3, the virtual interface 300 can include a front-end driver 310 and a virtual buffer 320, which together can provide an interface for exchange of packets between a virtual machine and a host program 330 in a host computing system.

During a packet transmission from the virtual machine, the front-end driver 310 can receive transmission packets 301 and store the transmission packets 301 in a transmit buffer 321 of the virtual buffer 320. The host program 330 can read the transmission packets 301 from the transmit buffer 321, for example, bypassing the hypervisor of the host computing system. During a packet reception, the host program 330 can store the received packets 302 in a reception buffer 322 of the virtual buffer 320, for example, bypassing the hypervisor of the host computing system. The front-end driver 310 can read the received packets 302 from the reception buffer 322 and output the received packets 302 to the virtual machine.

The front-end driver 310 can include a back pressure mechanism 311 to determine an availability of resources in the transmit buffer 321 of the virtual buffer 320 to store transmission packets 301. In some embodiments, the back pressure mechanism 311 can perform a resource check 313 on the transmit buffer 321, which can ascertain portions of the transmit buffer 321 having transmission packets 301 already read by the host program 330 and also portions of the transmit buffer 321 having transmission packets 301 awaiting to be read by the host program 330. The back pressure mechanism 222 can perform the resource check 313 in response to receiving a transmission packet 301 from the virtual machine or independently of any receiving a transmission packet 301.

The back pressure mechanism 311 can generate a saturation signal 314 based on the result of the resource check 313. In some examples, the back pressure mechanism 311 can pass along the results of the resource check 313 in the saturation signal 202, for example, identifying the portions of the transmit buffer 321 having transmission packets 301 already read by the host program 330 and also portions of the transmit buffer 321 having transmission packets 301 awaiting to be read by the host program 330. The back pressure mechanism 311 also can analyze the results of the resource check 313 to determine an available storage space within the transmit buffer 321. The back pressure mechanism 311 can generate the saturation signal 314 to indicate the available storage space within the transmit buffer 321.

Since the front-end driver 310 can control the throughput of the received packets 302 through the receive buffer 322, for example, by controlling a rate the received packets 302 are consumed or read from the receive buffer 322, the host program 330 can determine an available storage space in the reception buffer 322 prior to storing the received packet 302 to the receive buffer 322. The host program 330 can store the receive data packet 302 to the receive buffer 322 when the receive buffer 322 has available space to store the received packet 302. When the determined available space in the receive buffer 322 indicates the receive buffer 322 does not have available space to store the received packet 302, the host program 330 can stall the storage of the received packet 302 until the receive buffer 322 has available space to store the received packet 302.

Figure 4:
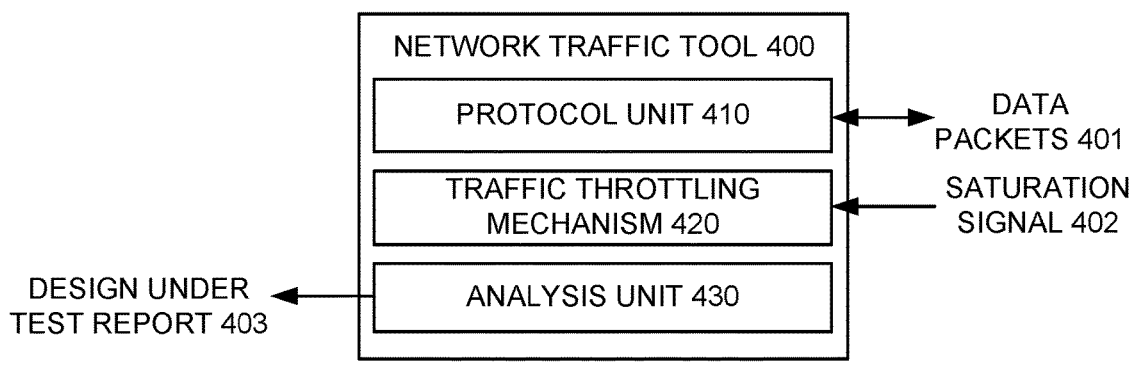
FIG. 4 illustrates an example network traffic tool implemented in a virtual machine of a host computing system according to various embodiments.

FIG. 4 illustrates an example network traffic tool 400 implemented in a virtual machine of a host computing system according to various embodiments. Referring to FIG. 4, the network traffic tool 400 can include a protocol unit 410 to exchange data packets 401 with a verification system, for example, in conformity with at least one network protocol. The protocol unit 410, in some embodiments, can generate one or more of the data packet 401, which the protocol unit 410 can transmit towards the verification system. The protocol unit 410 also can receive one or more of the data packets 401 from the verification system.

When the network traffic tool 400 is implemented in the virtual machine of the host computing system, the protocol unit 410 can output one or more of the data packets 401 to a virtual interface in the host computing system for transmission towards the verification system. The virtual interface can pass the data packets 401 output from the protocol unit 410 to a host program in the host computing system, which can transmit those data packets 401 to the verification system. The protocol unit 410 also can receive one or more of the data packets 401 from the verification system via the virtual interface and the host program.

The network traffic tool 400 can include a traffic throttling mechanism 420 to receive a saturation signal 402, which can indicate an availability of resources within a virtual buffer in the virtual interface to store one or more of the data packets 401 output from the protocol unit 410. In some embodiments, the saturation signal 402 can indicate that the virtual buffer did not have enough storage space to store a data packet previously output from the protocol unit 410. The traffic throttling mechanism 420 can utilize the saturation signal 402 to selectively prompt the protocol unit 410 to stall transmission of one or more of the data packets 401 towards the verification system.

In some embodiments, the traffic throttling mechanism 420 can identify the available storage space within the virtual buffer based on the saturation signal 402. When the traffic throttling mechanism 420 determines a size of the next data packet the protocol unit 410 intends to transmit towards the verification system exceeds the available storage space within the virtual buffer, the traffic throttling mechanism 420 can prompt the protocol unit 410 to stall transmission of the next data packet. In some embodiments, the traffic throttling mechanism 420 can prompt the protocol unit 410 to stall transmission of the next data packet for a predetermined period of time, to stall transmission by altering a transmission rate of one or more future data packets, to stall transmission until the traffic throttling mechanism 420 provides a prompt for the protocol unit 410 to transmit the next data packet, or the like.

When the traffic throttling mechanism 420 determines the available storage space within the virtual buffer exceeds a size of the next data packet the protocol unit 410 intends to transmit towards the verification system, the traffic throttling mechanism 420 can indicate that the protocol unit 410 can transmit the next data packet. In some embodiments, the traffic throttling mechanism 420 also may indicate that the protocol unit 410 can increase a transmission rate of one or more future data packets based on a size of the storage space in the virtual buffer.

The network traffic tool 400 can include an analysis unit 430 to generate at least one design under test report 403 associated with the exchange of the data packets 401 with the verification system. In some embodiments, the design under test report 403 can indicate how a design under test implemented in the verification system conformed to the at least one network protocol associated with the data packets 401. The design under test report 403 also may indicate how the design under test implemented in the verification system responded to the data packets 401 generated and transmitted by the protocol unit 410.

Figure 5:
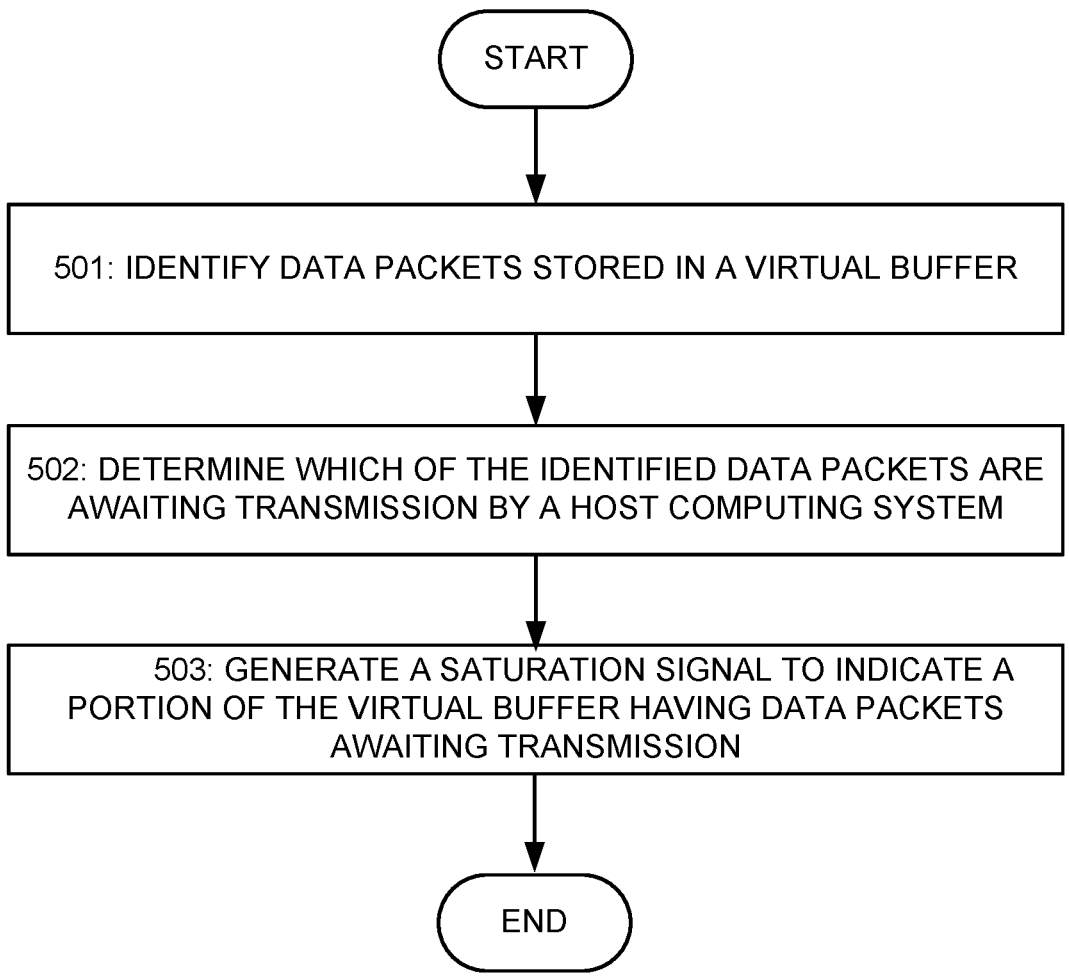
FIG. 5 illustrates an example flowchart for back pressure in a virtual interface of a host computing system according to various embodiments.

FIG. 5 illustrates an example flowchart for back pressure in a virtual interface of a host computing system according to various embodiments. Referring to FIG. 5, in a block 501, a back pressure mechanism implemented in the host computing system can identify data packets stored in a virtual buffer of a virtual interface. The virtual interface can be utilized to exchange the data packets between a virtual machine and a host program in the host computing system. In some embodiments, the back pressure mechanism can be implemented in a para-virtualized driver, which can exchange data packets between the virtual machine and the virtual buffer.

In a block 502, the back pressure mechanism implemented in the host computing system can determine which of the identified data packets are awaiting transmission by the host computing system. In some embodiments, the virtual buffer can include storage elements having multiple states, such as empty, storing data yet to be consumed, and storing data already consumed. The back pressure mechanism can perform a check of the virtual buffer to determine which of the storage elements have a state of storing data yet to be consumed by a host program. The back pressure mechanism also can perform a check of the virtual buffer to determine which of the storage elements have a state of storing data already consumed by the host program.

In a block 503, the back pressure mechanism implemented in the host computing system can generate a saturation signal to indicate a portion of the virtual buffer having data packets awaiting transmission. The saturation signal may identify or include the results of the check, the space in the virtual buffer available for storage of data packets, that the virtual buffer had insufficient available space to store a data packet previously provided from the virtual machine, or the like. The saturation signal, in some embodiments, can identify a number of the storage elements having a state of storing data yet to be consumed by a host program. The back pressure mechanism may compare the total storage space of the virtual buffer to the results of the check, and generate the saturation signal to identify the space in the virtual buffer available for storage of data packets. When the back pressure mechanism determines from the check that the virtual buffer has insufficient storage resources available to store a data packet previously provided from the virtual machine, the saturation signal may identify there was not enough space in the virtual buffer to store the previously provided data packet.

Figure 6:
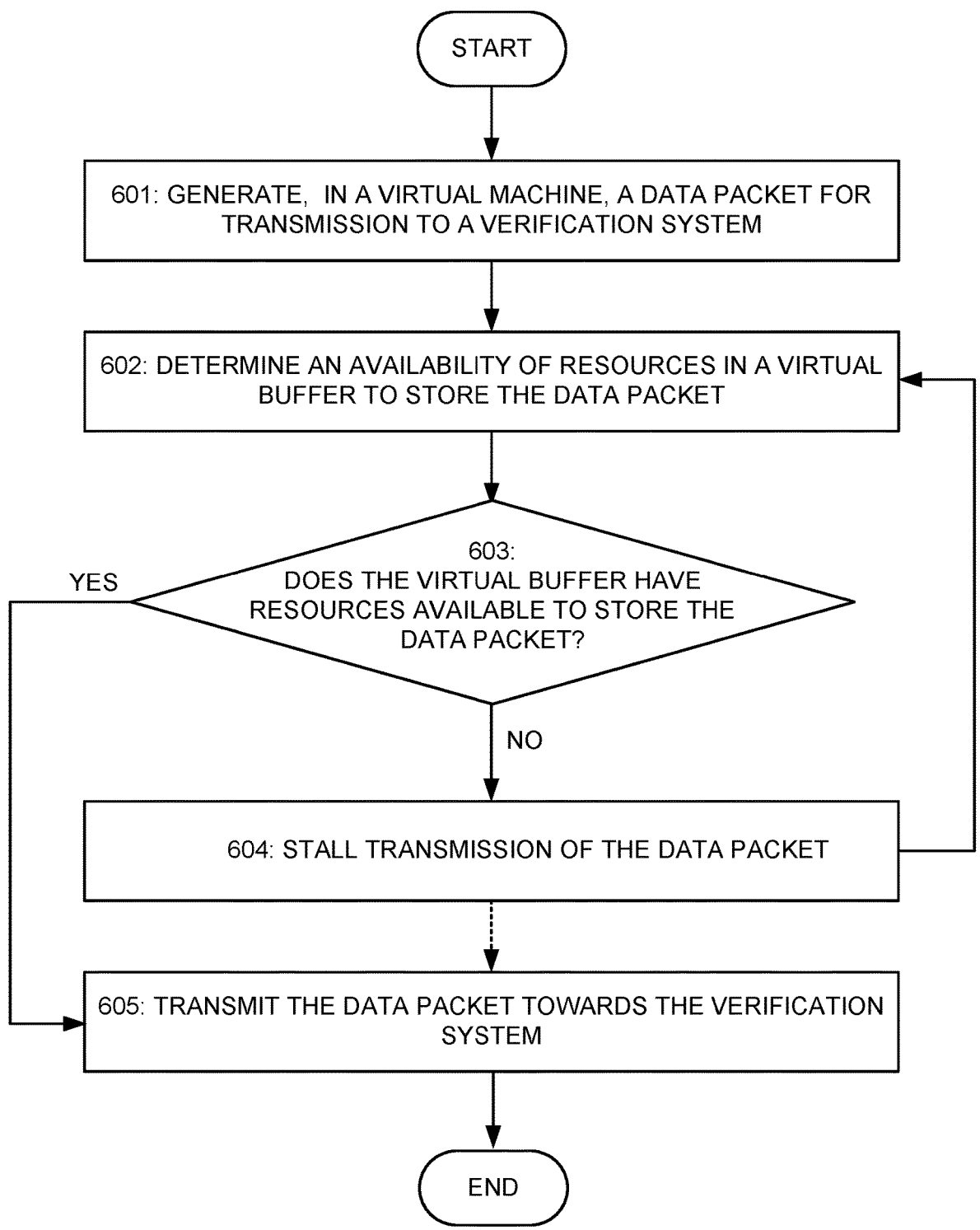
FIG. 6 illustrates an example flowchart for traffic control by a network traffic tool according to various embodiments.

FIG. 6 illustrates an example flowchart for traffic control by a network traffic tool according to various embodiments. Referring to FIG. 6, in a block 601, the network traffic tool implemented in a virtual machine of a host computing system can generate a data packet for transmission to a verification system. The network traffic tool may generate the data packet to conform with one or more transmission protocols.

In a block 602, the network traffic tool can determine an availability of resources in a virtual buffer to store the data packet. In some embodiments, the network traffic tool can utilize a saturation signal, for example, from a front-end driver, to determine the availability of resources in the virtual buffer. For example, when the saturation signal identifies a portion of the virtual buffer storing data packets awaiting transmission, the network traffic tool can determine the storage space available in the virtual buffer to store the data packet. In some embodiments, a lack of a saturation signal, for example, from the front-end driver, can indicate the virtual buffer is not saturated with data packets.

In a block 603, the network traffic tool can determine whether the virtual buffer has resources available to store the data packet. In some embodiments, the network traffic tool may determine if the virtual buffer has resources available to store the data packet by comparing the storage space available in the virtual buffer with a size of the data packet to store in the virtual buffer.

When, in the block 603, the network traffic tool determines the virtual buffer has resources available to store the data packet, execution can proceed to a block 605, where the network traffic tool can transmit the data packet towards the verification system. The network traffic tool can have a front-end driver store the data packet to the virtual buffer. A host program implemented in the host computing system can read the data packet from the virtual buffer and forward it towards the verification system.

When, in the block 603, the network traffic tool determines the virtual buffer does not have resources available to store the data packet, execution can proceed to a block 604, where the network traffic tool can stall transmission of the data packet towards the verification system. In some embodiments, the network traffic tool can stall transmission of the data packet for a predetermined period of time, alter a data packet transmission rate, or the like. Execution can proceed back to block 602 where the network traffic tool determines an availability of resources in the virtual buffer. When the stall of the transmission of the data packet is temporary, the execution can instead proceed to the block 605.

Illustrative Operating Environment

The execution of various low-level sensor fusion and driving automation processes according to embodiments may be implemented using computer-executable software instructions executed by one or more programmable computing devices. Because these embodiments may be implemented using software instructions, the components and operation of a programmable computer system on which various embodiments may be employed will be described below.

Figure 7:
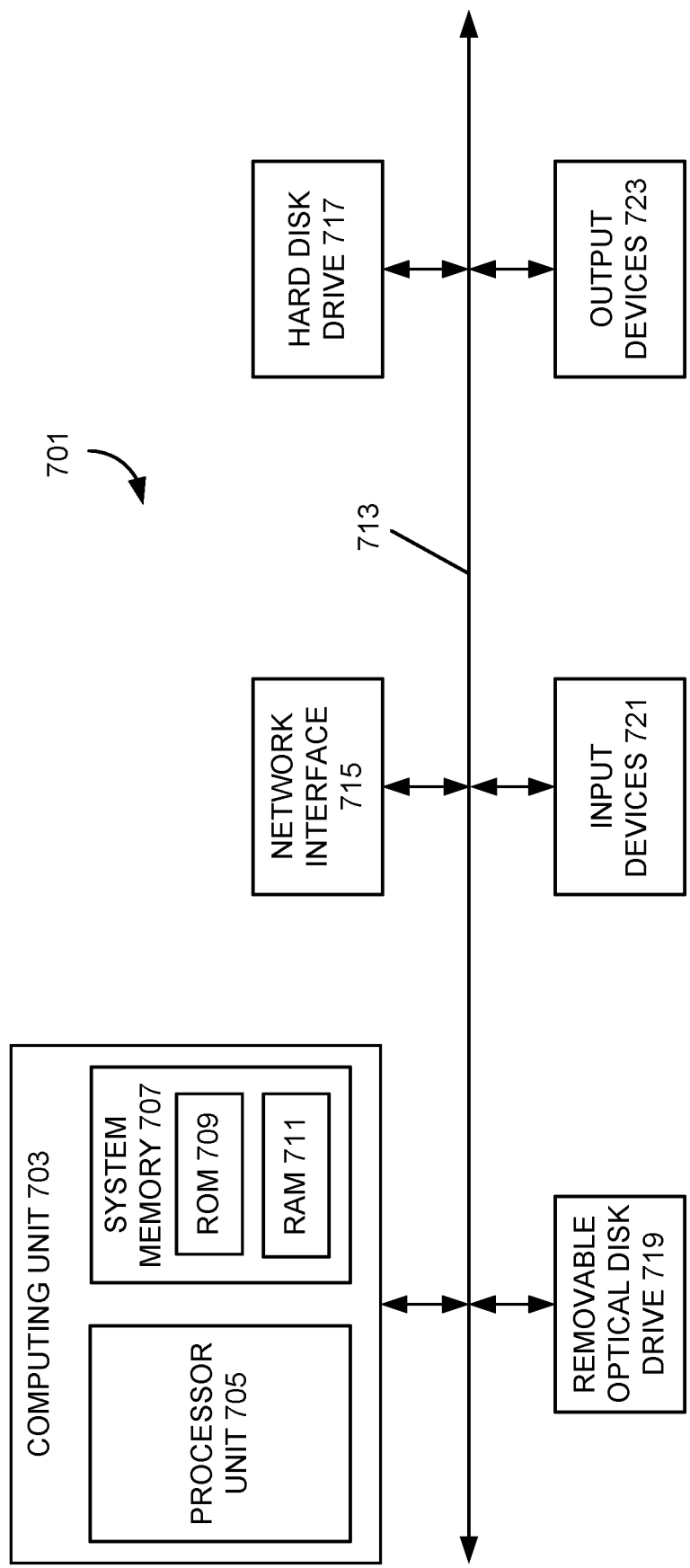
FIGS. 7 and 8 illustrate an example of a computer system of the type that may be used to implement various embodiments.
Figure 8:
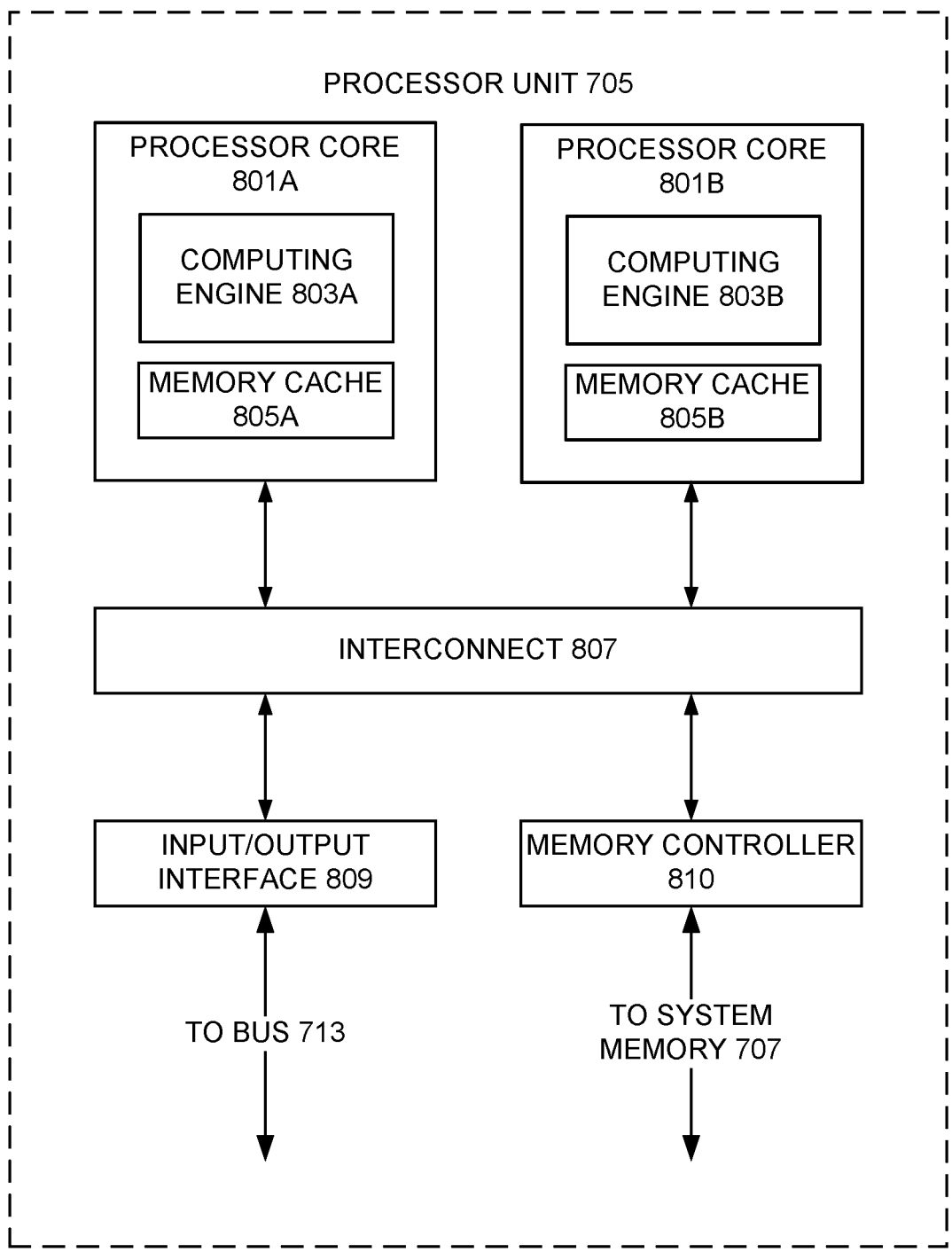

FIGS. 7 and 8 illustrate an example of a computer system of the type that may be used to implement various embodiments. Referring to FIG. 7, various examples may be implemented through the execution of software instructions by a computing device 701, such as a programmable computer. Accordingly, FIG. 7 shows an illustrative example of a computing device 701. As seen in FIG. 7, the computing device 701 includes a computing unit 703 with a processing unit 705 and a system memory 707. The processing unit 705 may be any type of programmable electronic device for executing software instructions, but will conventionally be a microprocessor. The system memory 707 may include both a read-only memory (ROM) 709 and a random access memory (RAM) 711. As will be appreciated by those of ordinary skill in the art, both the read-only memory (ROM) 709 and the random access memory (RAM) 711 may store software instructions for execution by the processing unit 705.

The processing unit 705 and the system memory 707 are connected, either directly or indirectly, through a bus 713 or alternate communication structure, to one or more peripheral devices 717-723. For example, the processing unit 705 or the system memory 707 may be directly or indirectly connected to one or more additional memory storage devices, such as a hard disk drive 717, which can be magnetic and/or removable, a removable optical disk drive 719, and/or a flash memory card. The processing unit 705 and the system memory 707 also may be directly or indirectly connected to one or more input devices 721 and one or more output devices 723. The input devices 721 may include, for example, a keyboard, a pointing device (such as a mouse, touchpad, stylus, trackball, or joystick), a scanner, a camera, and a microphone. The output devices 723 may include, for example, a monitor display, a printer and speakers. With various examples of the computing device 701, one or more of the peripheral devices 717-723 may be internally housed with the computing unit 703. Alternately, one or more of the peripheral devices 717-723 may be external to the housing for the computing unit 703 and connected to the bus 713 through, for example, a Universal Serial Bus (USB) connection.

With some implementations, the computing unit 703 may be directly or indirectly connected to a network interface 715 for communicating with other devices making up a network. The network interface 715 can translate data and control signals from the computing unit 703 into network messages according to one or more communication protocols, such as the transmission control protocol (TCP) and the Internet protocol (IP). Also, the network interface 715 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 701 is illustrated as an example only, and it not intended to be limiting. Various embodiments may be implemented using one or more computing devices that include the components of the computing device 701 illustrated in FIG. 7, which include only a subset of the components illustrated in FIG. 7, or which include an alternate combination of components, including components that are not shown in FIG. 7. For example, various embodiments may be implemented using a multi-processor computer, a plurality of single and/or multiprocessor computers arranged into a network, or some combination of both.

With some implementations, the processor unit 705 can have more than one processor core. Accordingly, FIG. 8 illustrates an example of a multi-core processor unit 705 that may be employed with various embodiments. As seen in this figure, the processor unit 705 includes a plurality of processor cores 801A and 801B. Each processor core 801A and 801B includes a computing engine 803A and 803B, respectively, and a memory cache 805A and 805B, respectively. As known to those of ordinary skill in the art, a computing engine 803A and 803B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 803A and 803B may then use its corresponding memory cache 805A and 805B, respectively, to quickly store and retrieve data and/or instructions for execution.

Each processor core 801A and 801B is connected to an interconnect 807. The particular construction of the interconnect 807 may vary depending upon the architecture of the processor unit 705. With some processor cores 801A and 801B, such as the Cell microprocessor created by Sony Corporation, Toshiba Corporation and IBM Corporation, the interconnect 807 may be implemented as an interconnect bus. With other processor units 801A and 801B, however, such as the Opteron™ and Athlon™ dual-core processors available from Advanced Micro Devices of Sunnyvale, Calif., the interconnect 807 may be implemented as a system request interface device. In any case, the processor cores 801A and 801B communicate through the interconnect 807 with an input/output interface 809 and a memory controller 810. The input/output interface 809 provides a communication interface between the processor unit 705 and the bus 713. Similarly, the memory controller 810 controls the exchange of information between the processor unit 705 and the system memory 707. With some implementations, the processor unit 705 may include additional components, such as a high-level cache memory accessible shared by the processor cores 801A and 801B. It also should be appreciated that the description of the computer network illustrated in FIG. 7 and FIG. 8 is provided as an example only, and it not intended to suggest any limitation as to the scope of use or functionality of alternate embodiments.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in a computer-readable memory device. The memory device may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory device may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory devices may be "read only" by design (ROM) by virtue of permission settings, or not. Other examples of memory devices may include, but may not be limited to, WORM, EPROM, EEPROM, FLASH, NVRAM, OTP, or the like, which may be implemented in solid state semiconductor devices. Other memory devices may comprise moving parts, such as a known rotating disk drive. All such memory devices may be "machine-readable" and may be readable by a processing device.

Operating instructions or commands may be implemented or embodied in tangible forms of stored computer software (also known as "computer program" or "code"). Programs, or code, may be stored in a digital memory device and may be read by the processing device. "Computer-readable storage medium" (or alternatively, "machine-readable storage medium") may include all of the foregoing types of computer-readable memory devices, as well as new technologies of the future, as long as the memory devices may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments, those skilled in the art will appreciate that there are numerous variations and permutations of the above described systems and techniques that fall within the spirit and scope of the invention as set forth in the appended claims. For example, while specific terminology has been employed above to refer to systems and processes, it should be appreciated that various examples of the invention may be implemented using any desired combination of systems and processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    generating, by a virtual machine in a computing system, a data packet for transmission to a host program in the computing system via a virtual buffer, wherein the host program is configured to transmit the data packet to a verification system implementing a design under test;
    receiving, by the virtual machine, a saturation signal generated by a virtual interface driver configured to populate the virtual buffer with the data packet;
    determining, by the virtual machine, available storage space in the virtual buffer to store the data packet based, at least in part, on the saturation signal; and
    delaying, by the virtual machine, transmission of the data packet by the virtual machine to the host program in the computing system via the virtual buffer when a size of the data packet exceeds a magnitude of the available storage space in the virtual buffer to store the data packet.

2. The method of claim 1, wherein delaying transmission of the data packet to the host program in the computing system is based on the available storage space in the virtual buffer indicated by the saturation signal.

3. The method of claim 1 further comprises transmitting the data packet for population in the virtual buffer when the magnitude of the available storage space in the virtual buffer exceeds the size of the data packet.

4. The method of claim 1, wherein the virtual interface driver is configured to generate the saturation signal based, at least in part, on which portions of the virtual buffer include other data packets from the virtual machine that are awaiting transmission to the host program in the computing system.

5. The method of claim 1, further comprises receiving, by the virtual machine, a different data packet from the host program via the virtual buffer, wherein the host program in the computing system is configured selectively store the different data packet to the virtual buffer based on resources in the virtual buffer available to the store the different data packet.

6. An apparatus comprising at least one memory device storing instructions configured to cause one or more processing devices to perform operations comprising:
   generating, by a virtual machine implemented by the one or more processing devices, a data packet for transmission to a host program implemented by the one or more processing devices via a virtual buffer, wherein the host program is configured to transmit the data packet to a verification system implementing a design under test;
   receiving, by the virtual machine, a saturation signal generated by a virtual interface driver configured to populate the virtual buffer with the data packet;
   determining, by the virtual machine, available storage space in the virtual buffer to store the data packet based, at least in part, on the saturation signal; and
   delaying, by the virtual machine, transmission of the data packet by the virtual machine to the host program in the computing system via the virtual buffer when a size of the data packet exceeds a magnitude of the available storage space in the virtual buffer to store the data packet.

7. The apparatus of claim 6, wherein delaying transmission of the data packet to the host program in the computing system is based on the available storage space in the virtual buffer indicated by the saturation signal.

8. The apparatus of claim 6, wherein the instructions are further configured to cause the one or more processing devices to perform operations comprising transmitting the data packet for population in the virtual buffer when the magnitude of the available storage space in the virtual buffer exceeds the size of the data packet.

9. The apparatus of claim 6, wherein the virtual interface driver is configured to generate the saturation signal based, at least in part, on which portions of the virtual buffer include other data packets from the virtual machine that are awaiting transmission to the host program in the computing system.

10. The apparatus of claim 6, wherein the instructions are further configured to cause the one or more processing devices to perform operations comprising receiving, by the virtual machine, a different data packet from the host program via the virtual buffer, wherein the host program in the computing system is configured selectively store the different data packet to the virtual buffer based on resources in the virtual buffer available to the store the different data packet.

11. A system comprising:
   a memory device configured to store machine-readable instructions; and
   a computing system including one or more processing devices, in response to executing the machine-readable instructions, configured to:
      generate, with a virtual machine in the computing system, a data packet for transmission to a host program in the computing system via a virtual buffer, wherein the host program is configured to transmit the data packet to a verification system implementing a design under test;
      receive, with the virtual machine, a saturation signal generated by a virtual interface driver configured to populate the virtual buffer with the data packet;
      determine, with the virtual machine, available storage space in the virtual buffer to store the data packet based, at least in part, on the saturation signal; and
      delay, by the virtual machine, transmission of the data packet by the virtual machine to the host program in the computing system via the virtual buffer when a size of the data packet exceeds a magnitude of the available storage space in the virtual buffer to store the data packet.

12. The system of claim 11, wherein the delay in the transmission of the data packet to the host program in the computing system is based on the available storage space in the virtual buffer indicated by the saturation signal.

13. The system of claim 11, wherein the one or more processing devices, in response to executing the machine-readable instructions, are configured to transmit the data packet for population in the virtual buffer when the magnitude of the available storage space in the virtual buffer exceeds the size of the data packet.

14. The system of claim 11, wherein the virtual interface driver is configured to generate the saturation signal based, at least in part, on which portions of the virtual buffer include other data packets from the virtual machine that are awaiting transmission to the host program in the computing system.

15. The system of claim 11, wherein the one or more processing devices, in response to executing the machine-readable instructions, are configured to receive, with the virtual machine, a different data packet from the host program via the virtual buffer, wherein the host program in the computing system is configured selectively store the different data packet to the virtual buffer based on resources in the virtual buffer available to the store the different data packet.

* * * * *